United States Patent
Savant

(10) Patent No.: US 9,258,318 B2
(45) Date of Patent: Feb. 9, 2016

(54) SYSTEMS AND METHODS FOR INFORMING USERS ABOUT APPLICATIONS AVAILABLE FOR DOWNLOAD

(71) Applicant: Symantec Corporation, Mountain View, CA (US)

(72) Inventor: Anubhav Savant, Culver City, CA (US)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 14/178,279

(22) Filed: Feb. 12, 2014

(65) Prior Publication Data
US 2015/0229655 A1  Aug. 13, 2015

(51) Int. Cl.
| | |
|---|---|
| *G06F 21/44* | (2013.01) |
| *H04L 29/06* | (2006.01) |
| *H04L 29/08* | (2006.01) |
| *G06F 21/12* | (2013.01) |
| *G06F 9/445* | (2006.01) |
| *G06F 21/51* | (2013.01) |

(52) U.S. Cl.
CPC .............. *H04L 63/1408* (2013.01); *G06F 8/61* (2013.01); *G06F 21/126* (2013.01); *G06F 21/44* (2013.01); *G06F 21/51* (2013.01); *H04L 63/145* (2013.01); *H04L 67/06* (2013.01)

(58) Field of Classification Search
CPC ...... G06F 21/126; G06F 21/44; H04L 63/145
See application file for complete search history.

(56) References Cited

U.S. PATENT DOCUMENTS

| | | | |
|---|---|---|---|
| 6,282,709 B1 | 8/2001 | Reha et al. | |
| 2006/0242712 A1* | 10/2006 | Linn et al. | 726/26 |
| 2011/0047620 A1 | 2/2011 | Mahaffey et al. | |
| 2012/0243043 A1* | 9/2012 | Asai | 358/1.15 |
| 2012/0246630 A1 | 9/2012 | Kuzins et al. | |
| 2013/0132565 A1* | 5/2013 | Cetin et al. | 709/224 |
| 2013/0254880 A1 | 9/2013 | Alperovitch et al. | |
| 2013/0283377 A1 | 10/2013 | Das et al. | |
| 2013/0333039 A1* | 12/2013 | Kelly | 726/24 |
| 2013/0347094 A1* | 12/2013 | Bettini et al. | 726/11 |
| 2014/0090077 A1 | 3/2014 | Jeong et al. | |
| 2014/0096246 A1* | 4/2014 | Morrissey et al. | 726/23 |

OTHER PUBLICATIONS

Barrera et al., "Understanding and Improving App Installation Security Mechanisms through Empirical Analysis of Android", 2012, pp. 81-92.*

(Continued)

*Primary Examiner* — Taghi Arani
*Assistant Examiner* — Thaddeus Plecha
(74) *Attorney, Agent, or Firm* — ALG Intellectual Property, LLC

(57) ABSTRACT

A computer-implemented method for informing users about applications available for download may include (1) identifying, through sharing functionality provided by an operating system, shared content that identifies an application hosted by an application distribution platform, (2) in response to identifying the shared content, obtaining security information about the identified by the shared content, and (3) informing, prior to a user downloading the application, the user of the obtained security information about the application to enable the user to make an informed decision about whether to download the application. Various other methods, systems, and computer-readable media are also disclosed.

20 Claims, 8 Drawing Sheets

(56) References Cited

OTHER PUBLICATIONS

Anubhav Savant; Systems and Methods for Providing Information Identifying the Trustworthiness of Applications on Application Distribution Platforms; U.S. Appl. No. 14/338,539, filed Jul. 23, 2014.
Anubhav Savant, et al; Systems and Methods for Modifying Applications Without User Input; U.S. Appl. No. 14/445,704, filed Jul. 29, 2014.
"AccessibilityService", http://developer.android.com/reference/android/accessibilityservice/AccessibilityService.html, as accessed May 30, 2014, Android, (Nov. 15, 2009).
"Digital distribution", http://en.wikipedia.org/wiki/Digital_distribution, as accessed May 30, 2014, Wikipedia, (Jun. 15, 2005).
"Building Accessibility Services", http://developer.android.com/guide/topics/ui/accessibility/services.html, as accessed May 30, 2014, Android, (Apr. 14, 2012).
"Sending Simple Data to Other Apps", http://developer.android.com/training/sharing/send.html, as accessed Jan. 7, 2014, (Jan. 4, 2012).
"Google Play", http://en.wikipedia.org/wiki/Google_Play, as accessed Jan. 7, 2014, Wikipedia, (Mar. 7, 2012).
Zeqing Qi, et al; Systems and Methods for Updating Applications; U.S. Appl. No. 14/305,497, filed Jun. 16, 2014.
Anubhav Savant; Systems and Methods for Evaluating Content Provided to Users via User Interfaces; U.S. Appl. No. 14/698,885, filed Apr. 29, 2015.
"ApplicationId versus PackageName", http://tools.android.com/tech-docs/new-build-system/applicationid-vs-packagename, as accessed Mar. 3, 2015, Android Tools Project Site, (Oct. 3, 2014).
Beal, Vangie "API—application program interface", http://www.webopedia.com/TERM/A/API.html, as accessed Mar. 3, 2015, Webopedia, (Jun. 21, 2000).
"AccessibilityEvent", http://developer.android.com/reference/android/view/accessibility/AccessibilityEvent.html, as accessed Mar. 3, 2015, Android Developers, (Oct. 10, 2009).
"Greenify", https://play.google.com/store/apps/details?id=com.oasisfeng.greenify&hl=en, as accessed May 30, 2014, (Jun. 19, 2013).
"Receiving Simple Data from Other Apps", http://developer.android.com/training/sharing/receive.html, as accessed Jan. 7, 2014, (Jan. 3, 2012).
Christopher Woodward; Systems and Methods for Detecting Advertisements Displayed to Users Via User Interfaces; U.S. Appl. No. 14/812,707, filed Jul. 29, 2015.
Jonathon Salehpour; Systems and Methods for Detecting When Users Are Uninstalling Applications; U.S. Appl. No. 14/824,539, filed Aug. 12, 2015.
Ramakrishnan Meenakshi Sundaram; Systems and Methods for Protecting Computing Devices From Imposter Accessibility Services; U.S. Appl. No. 14/837,383, filed Aug. 27, 2015.
"Is it possible to detect Android app uninstall?", http://stackoverflow.com/questions/6209730/is-it-possible-to-detect-android-app-uninstall, as accessed Jun. 25, 2015, Stack Overflow, (Jun. 2, 2011).
"Android not receiving Intent Action_Package_Removed in the removed package", http://stackoverflow.com/questions/3648166/android-not-receiving-intent-action-package-removed-in-the-removed-package, as accessed Jun. 25, 2015, Stack Overflow, (Sep. 5, 2010).
"PackageInstaller", https://developer.android.com/reference/android/content/pm/PackageInstaller.html, as accessed Jun. 25, 2015, Android Developers, (Oct. 20, 2014).
"AccessibilityService", http://developer.android.com/reference/android/accessibilityservice/AccessibilityService.html, as accessed Jun. 25, 2015, Android Developers, (Nov. 15, 2009).
"Developing an Accessibility Service", http://developer.android.com/training/accessibility/service.html, as accessed Jun. 25, 2015, Android Developers, (Apr. 13, 2012).
"AlertDialog", http://developer.android.com/reference/android/app/AlertDialog.html, as accessed Jun. 25, 2015, Android Developers, (Feb. 18, 2009).
"Artimys", https://artimysapi.appspot.com/, as accessed Jun. 4, 2015, (2013).
Coyne, Sarah M., et al., "Profanity in Media Associated With Attitudes and Behavior Regarding Profanity Use and Aggression", http://pediatrics.aappublications.org/content/early/2011/10/14/peds.2011-1062.abstract, as accessed Jun. 4, 2015, Pediatrics, American Academy of Pediatrics, (Oct. 17, 2011).
"Android.accessibilityservice", https://developer.android.com/reference/android/accessibilityservice/package-summary.html, as accessed Jun. 4, 2015, Android Developers, (Sep. 22, 2009).
Kraunelis, Joshua et al., "On Malware Leveraging the Android Accessibility Framework", http://www.umac.mo/rectors_office/docs/weizhao_cv/pub_refereed_journals/2015_ref_journals/On%20Malware.pdf, as accessed Jun. 4, 2015, ICST Transactions Preprint, (2013 or earlier).
"Adblock Plus", https://adblockplus.org/, as accessed Jun. 4, 2015, (Aug. 21, 2006).
"AccessibilityEvent", http://developer.android.com/reference/android/view/accessibility/AccessibilityEvent.html, as accessed Jun. 4, 2015, Android Developers, (Oct. 10, 2009).
Ramakrishnan Meenakshi Sundaram; Systems and Methods for Enabling Parental Control Applications to Enforce Rules on Third-Party Applications; U.S. Appl. No. 14/817,236, filed Aug. 4, 2015.

* cited by examiner

SYSTEMS AND METHODS FOR INFORMING USERS ABOUT APPLICATIONS AVAILABLE FOR DOWNLOAD

BACKGROUND

Individuals and organizations increasingly discover applications via mobile devices. For example, tablet and smartphone users frequently learn about and download applications from various application distribution platforms, such as the GOOGLE PLAY store or the APPLE application store (e.g., ITUNES). Unfortunately, not all of the applications available on these platforms may be safe and/or satisfactory for users. For example, some platforms may be slow to (or completely fail to) identify a security issue with an application and/or prevent downloads of an unsecure or compromised application.

Moreover, some platforms may provide only limited information about an application's security implications and/or fail to provide other information that may be helpful to a user in evaluating whether to download or install an application. For example, platforms may fail to provide information that identifies the performance, security, and/or annoyance impact of an application on a user's device.

Some third-party security vendors have attempted to resolve these issues by providing security applications that supplement or provide additional information about applications hosted by such platforms. Unfortunately, these third-party applications typically fail to present this supplemental information in a manner that enables users to evaluate the same while browsing a platform for applications to download. As such, users may be limited to the information provided by the platform itself while browsing the same, without the benefit of the supplemental information that third-party applications may provide. Moreover, although the above discussion focuses on mobile applications, parallel problems apply to non-mobile and desktop applications and operating systems. The instant disclosure, therefore, identifies a need for improved systems and methods for informing users about applications available for download.

SUMMARY

As will be described in greater detail below, the instant disclosure generally describes various systems and methods for leveraging shared content to inform users about the security implications of applications hosted by application distribution platforms prior to downloading the same. In one example, a computer-implemented method for performing such a task may include (1) identifying, through sharing functionality provided by an operating system, shared content that identifies an application hosted by an application distribution platform, (2) in response to identifying the shared content, obtaining security information about the application identified by the shared content, and (3) informing, prior to a user downloading the application, the user of the obtained security information about the application to enable the user to make an informed decision about whether to download the application.

In some examples, identifying the shared content may include identifying the shared content in response to the user selecting an option for sharing functionality while the user is browsing the application distribution platform. Identifying the shared content may also include identifying the shared content in response to the user pressing a button indicated as a button for initiating sharing through the sharing functionality.

In some embodiments, identifying the shared content may include identifying the shared content in response to the user selecting a recipient to receive the shared content through the sharing functionality provided by the operating system. Moreover, identifying the shared content may include identifying the shared content in response to the user selecting an application to receive the shared content through the sharing functionality provided by the operating system.

In some examples, the selected application may be configured to handle an intent to share text through the sharing functionality provided by the operating system. In addition, identifying the shared content may include identifying the shared content in response to the user selecting a security application that obtains the security information and informs the user about the obtained security information.

In some examples, obtaining the security information may include looking up a reputation of the application identified by the shared content in a reputation database. Moreover, informing the user of the obtained security information may include informing the user about the reputation of the application.

In some embodiments, the shared content may include a location for the application on the application distribution platform and/or a name for the application. Moreover, the shared content may include a uniform resource locator for the application on the application distribution platform.

In one embodiment, a system for implementing the above-described method may include (1) an identification module, stored in memory, that identifies, through sharing functionality provided by an operating system, shared content that identifies an application hosted by an application distribution platform, (2) an obtaining module, stored in memory that, in response to identifying the shared content, obtains security information about the application identified by the shared content, (3) an informing module, stored in memory, that, prior to a user downloading the application, informs the user of the obtained security information about the application to enable the user to make an informed decision about whether to download the application, and (4) at least one processor that executes the identification module, the obtaining module, and the informing module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) identify, through sharing functionality provided by an operating system, shared content that identifies an application hosted by an application distribution platform, (2) in response to identifying the shared content, obtain security information about the application identified by the shared content, and (3) inform, prior to a user downloading the application, the user of the obtained security information about the application to enable the user to make an informed decision about whether to download the application.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification.

Together with the following description, these drawings demonstrate and explain various principles of the instant disclosure.

Figure 1:
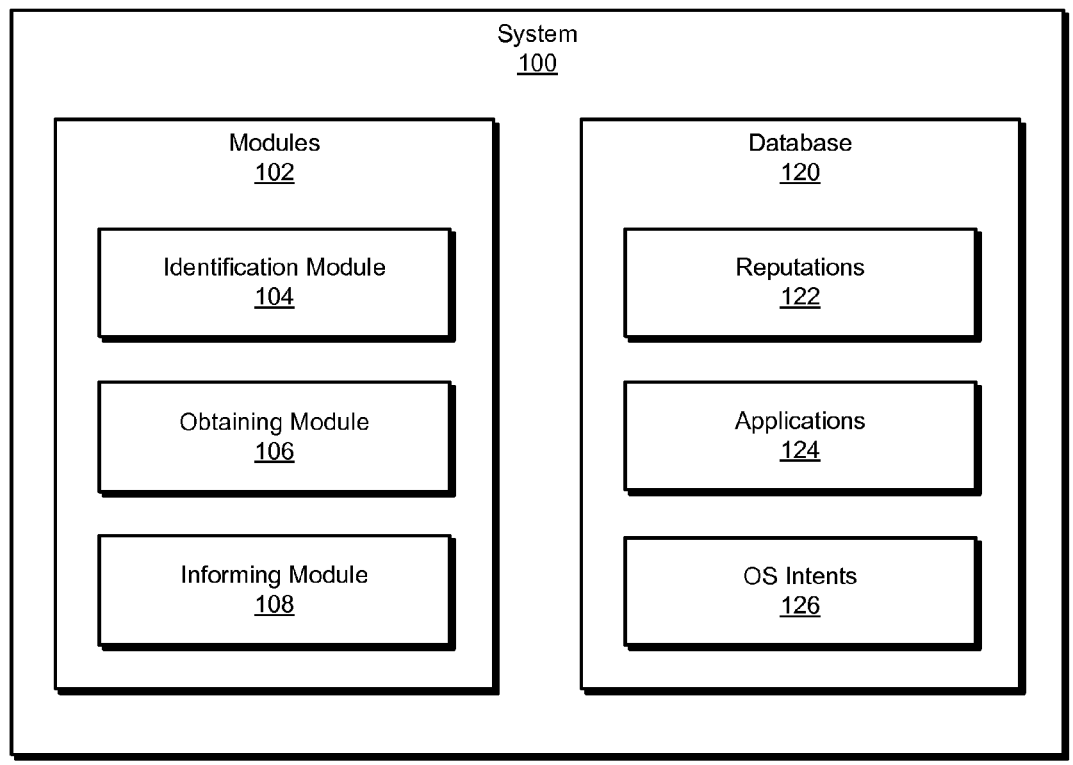
FIG. 1 is a block diagram of an exemplary system for informing users about applications available for download.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for informing users about applications available for download. As will be explained in greater detail below, the disclosed systems and methods may automatically inform a user about security implications associated with an application prior to the user downloading and/or executing the application. In doing so, the disclosed systems and methods may leverage sharing functionality provided by an operating system to streamline the education of the user. The user may thereby make better informed decisions about whether to download and/or execute various applications.

Figure 2:
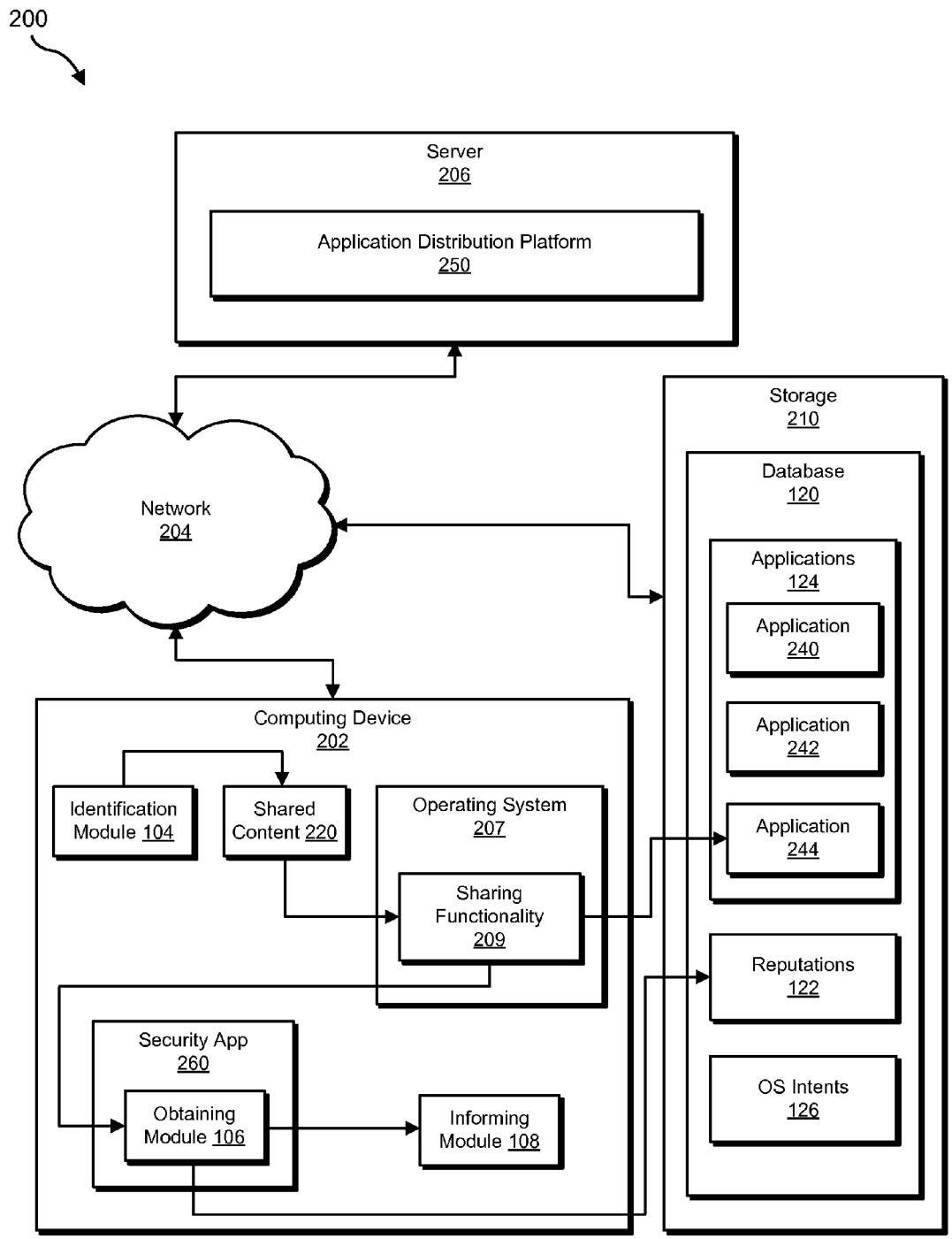
FIG. 2 is a block diagram of an additional exemplary system for informing users about applications available for download.

The following will provide, with reference to FIGS. 1-2, detailed descriptions of exemplary systems for informing users about applications available for download. Detailed descriptions of corresponding computer-implemented methods will also be provided in connection with FIGS. 3-6. In addition, detailed descriptions of an exemplary computing system and network architecture capable of implementing one or more of the embodiments described herein will be provided in connection with FIGS. 7 and 8, respectively.

FIG. 1 is a block diagram of an exemplary system 100 for informing users about applications available for download. As illustrated in this figure, exemplary system 100 may include one or more modules 102 for performing one or more tasks. For example, and as will be explained in greater detail below, exemplary system 100 may include an identification module 104 that identifies, through sharing functionality provided by an operating system, shared content that identifies an application hosted by an application distribution platform.

Exemplary system 100 may also include an obtaining module 106 that, in response to identifying the shared content, obtains security information about the application identified by the shared content.

In addition, and as will be described in greater detail below, exemplary system 100 may include an informing module 108 that informs, prior to a user downloading the application, the user of the obtained security information about the application to enable the user to make an informed decision about whether to download the application. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 710 in FIG. 7, and/or portions of exemplary network architecture 800 in FIG. 8. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store reputations 122, which may correspond to reputations and other security information for applications, as discussed further below. Database 120 may also be configured to store applications 124 (or identifiers of applications), as in an application distribution platform such as the GOOGLE PLAY STORE. As a last example, database 120 may be further configured to store operating system intents 126, which may define which applications are configured to handle, receive, and/or process "intents" to share specific items of data, such as text data. The following discussion of FIGS. 3-6 will provide more descriptions of applications and intent functionality.

Database 120 may represent portions of a single database or computing device or a plurality of databases or computing devices. For example, database 120 may represent a portion of server 206 in FIG. 2, computing system 710 in FIG. 7, and/or portions of exemplary network architecture 800 in FIG. 8. Alternatively, database 120 in FIG. 1 may represent one or more physically separate devices capable of being accessed by a computing device, such as server 206 in FIG. 2, computing system 710 in FIG. 7, and/or portions of exemplary network architecture 800 in FIG. 8.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204. In one example, computing device 202 may be programmed with one or more of modules 102 and/or may store all or a portion of the data in database 120. Additionally or alternatively, server 206 may be programmed with one or more of modules 102 and/or may store all or a portion of the data in database 120.

In one embodiment, one or more of modules 102 from FIG. 1 may, when executed by at least one processor of computing device 202 and/or server 206, enable computing device 202 and/or server 206 to inform users about applications available for download. For example, and as will be described in greater detail below, one or more of modules 102 may cause computing device 202 and/or server 206 to identify, through sharing functionality 209 provided by an operating system 207, shared content 220 that identifies an application, such as application 244, hosted by an application distribution platform 250 (which may host applications through internal or external storage 210). Similarly, one or more of modules 102 may cause computing device 202 and/or server 206, in response to identifying shared content 220, to obtain security information, such as a reputation from reputations 122, about application 244 identified by shared content 220. Lastly, one or more of modules 102 may cause computing device 202 and/or server 206 to inform, prior to a user downloading application 244, the user of the obtained security information about application 244 to enable the user to make an informed decision about whether to download application 244.

In the example of FIG. 2, a user of an operating system, such as a mobile operating system like GOOGLE ANDROID, may browse through application distribution platform 250 (e.g., the GOOGLE PLAY STORE). Upon browsing through the various applications there, the user may have a particular interest in a specific application, such as application 244. The user may then desire to download the application. In this example, application distribution platform 250 may not provide a complete set of information about the security implications of application 244. For example, application distribution platform 250 may lack information about privacy implications and/or settings, annoyance factors and/or scores, and/or a performance impact associated with application 244. Even if application distribution platform 250 provides information about traditional security threats like viruses, application distribution platform 250 may not provide information about how safely application 244 protects private information, engages in annoying and/or disruptive behavior (e.g., automated, repetitive, and/or conspicuous sounds and/or visuals or outputs), and/or degrades system performance (e.g., due to excessive resource consumption, such as memory and/or CPU consumption).

In view of the above, the user may select to share identifying information about application 244 to another application, which may supplement the information at application distribution platform 250 with other information otherwise missing, as discussed above. For example, the user may press a "share" button on a touch screen, and then select a security application (e.g., NORTON INSIGHT), which may receive shared content 220 that identifies application 244. In response, the security application may provide the further security information that was otherwise missing at application distribution platform 250, as discussed further below.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 710 in FIG. 7, or any other suitable computing device.

Server 206 generally represents any type or form of computing device that is capable of hosting, executing, and/or monitoring applications. Examples of server 206 include, without limitation, application servers and database servers configured to provide various database services and/or run certain software applications. Although FIG. 2 shows modules 102 residing client-side in computing device 202, any permutation of modules 102 may reside either client-side on one or more client devices and/or server-side on server 206.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 800 in FIG. 8, or the like. Network 204 may facilitate communication or data transfer using wireless or wired connections. In one embodiment, network 204 may facilitate communication between computing device 202 and server 206.

Figure 3:
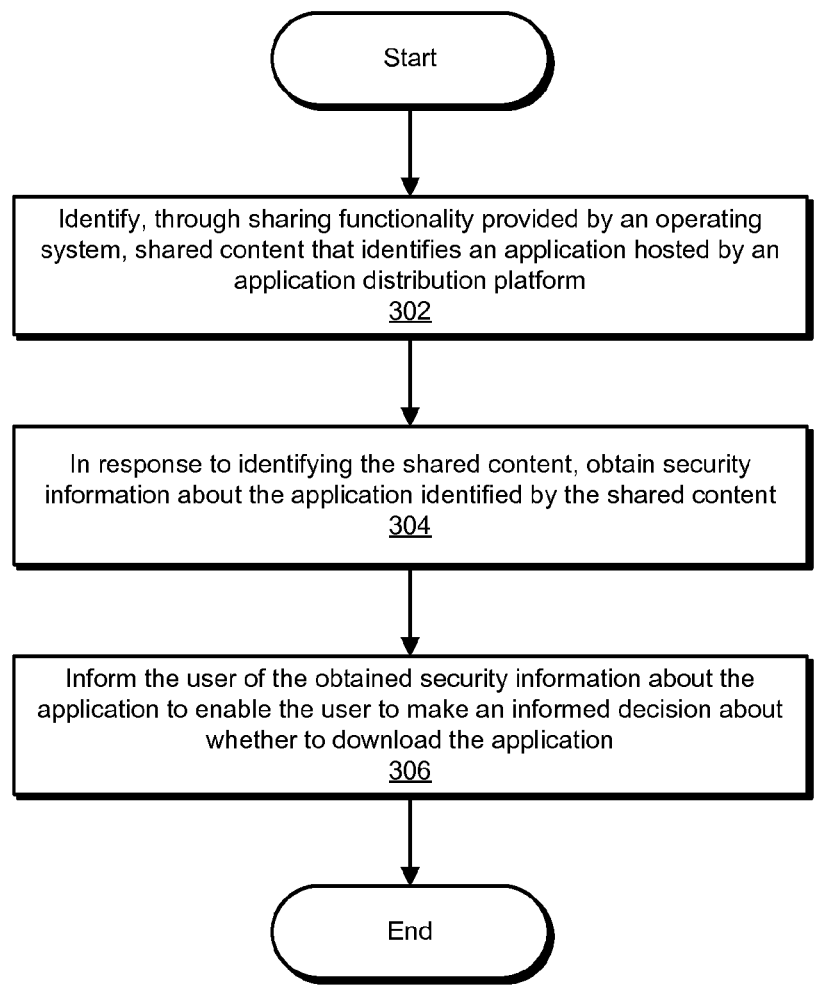
FIG. 3 is a flow diagram of an exemplary method for informing users about applications available for download.

FIG. 3 is a flow diagram of an exemplary computer-implemented method 300 for informing users about applications available for download. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 710 in FIG. 7, and/or portions of exemplary network architecture 800 in FIG. 8.

As illustrated in FIG. 3, at step 302 one or more of the systems described herein may identify, through sharing functionality provided by an operating system, shared content that identifies an application hosted by an application distribution platform. For example, identification module 104 may, as part of computing device 202 in FIG. 2, identify, through sharing functionality 209 provided by operating system 207, shared content 220 that identifies application 244 hosted by application distribution platform 250. As used herein, the phrase "sharing functionality provided by an operating system" generally refers to an operating system feature that enables applications executing on the operating system to specify their ability to "handle" and "receive" specific predefined types of data or objects from other applications also executing on the operating system. For example, a user may select a "share" button on one original application interface, which may trigger display of a list of applications available on the operating system that are configured, through the sharing functionality, to handle and receive predefined data or objects from the original application. The user may then select one of the applications on the list and "share" the data to the selected application through the sharing functionality.

Similarly, as used herein the phrase "application distribution platform" generally refers to any platform that hosts applications for download. One example of such platforms may include the GOOGLE PLAY STORE. Moreover, as used herein, the phrase "shared content" generally refers to instances of data in predefined formats, based on a file extension, variable type, programming language object type, and/or data structure type, such as a character string, integer, picture file, and/or video file (and/or aggregates of these within more complex predefined data structures, which may include their own methods). As described above, applications may announce to operating system 207, through sharing functionality 209, their ability to handle and/or receive any of these specified types of shared content 220, such that any application that expresses an ability to handle shared content 220 that fits the specified type may be available to a user or originating application to receive shared content 220.

Figure 4:
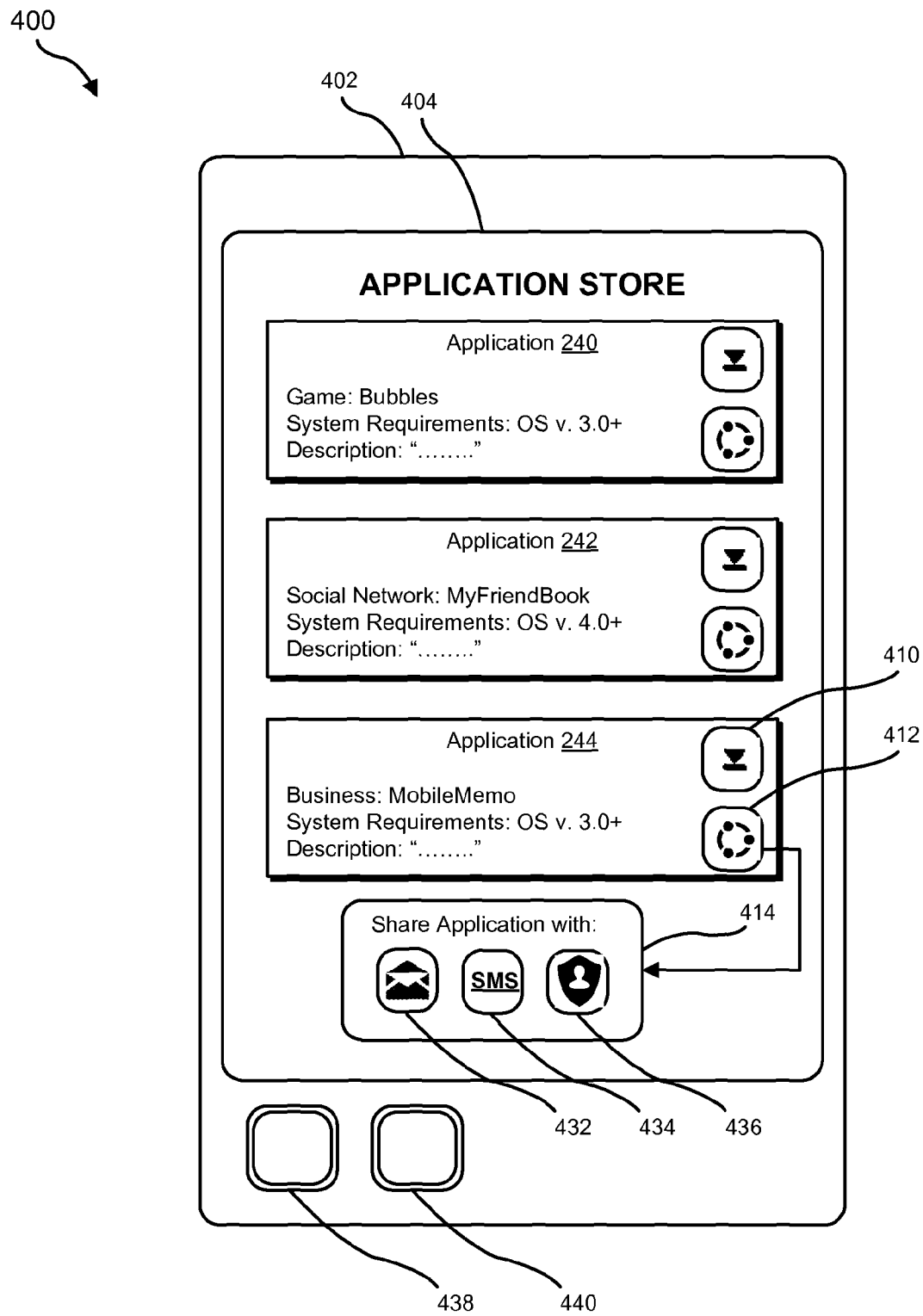
FIG. 4 is a block diagram of an exemplary graphical user interface for sharing content about an application.

Identification module 104 may identify shared content 220 in a variety of ways. In one embodiment, identification module 104 may identify shared content 220 by receiving shared content 220 through sharing functionality 209 provided by operating system 207. FIG. 4 shows an exemplary block diagram 400 indicating a smart phone 402, as one example of computing device 202, including a screen 404 that may provide access to application distribution platform 250 (e.g., "APPLICATION STORE" shown in FIG. 4). As further illustrated in FIG. 4, screen 404 may further show items, or windows, corresponding to each of application 240 (a game named "Bubbles"), application 242 (a social network program named "MyFriendBook"), and application 244 (a business application named "MobileMemo"). In the example of FIG. 4, each of these windows may further include a download button (or icon) 410 and a share button (or icon) 412, both of which may function as buttons through screen 404 as a touchscreen. Moreover, smart phone 402 may also include one or more generic physical buttons, such as buttons 438 and 440, which may serve as power and/or "back" buttons. Although illustrated using a touchscreen and buttons, smart phone 402 and application distribution platform 250 may provide applications, and information about applications, through any suitable output and/or input components, including visual, audio, vibration, voice recognition, command line, hardware buttons, and/or stylus components, etc.

In some examples, identification module 104 may identify shared content 220 in part by identifying shared content 220 in response to the user selecting an option for sharing functionality 209 while the user is browsing application distribution platform 250, as shown through screen 404. More specifically, identification module 104 may identify shared content 220 in part by identifying shared content 220 in response to the user pressing button 412 indicated as a button for initiating sharing through sharing functionality 209.

In further examples, identification module may identify shared content 220 in part by identifying shared content 220 in response to the user selecting a recipient to receive shared content 220 through sharing functionality 209 provided by operating system 207. In some examples, the recipient may include an application, a process, a thread, a user account (e.g., of the same or different operating system), a social network (or social network account), another device, a volume, an email account, and/or another operating system. For example, identification module 104 may identify shared content 220 in part by identifying shared content 220 in response to the user selecting an application to receive shared content 220 through sharing functionality 209 provided by operating system 207.

In the example of FIG. 4, upon selecting share button 412, identification module 104, operating system 207, and/or application distribution platform 250, may display a list of application(s) 414. As shown in FIG. 4, the list may include an email application, a SHORT MESSAGE SERVICE application, and/or a security or insight application, corresponding to a button 432, a button 434, and a button 436, respectively. More generally, list of applications 414 may include a list of any permutation of applications configured for sharing and/or receiving shared content through sharing functionality 209. Identification module 104 may receive a selection of one or more applications in list of applications 414, thereby initiating sharing of shared content 220 with the selected application.

Figure 5:
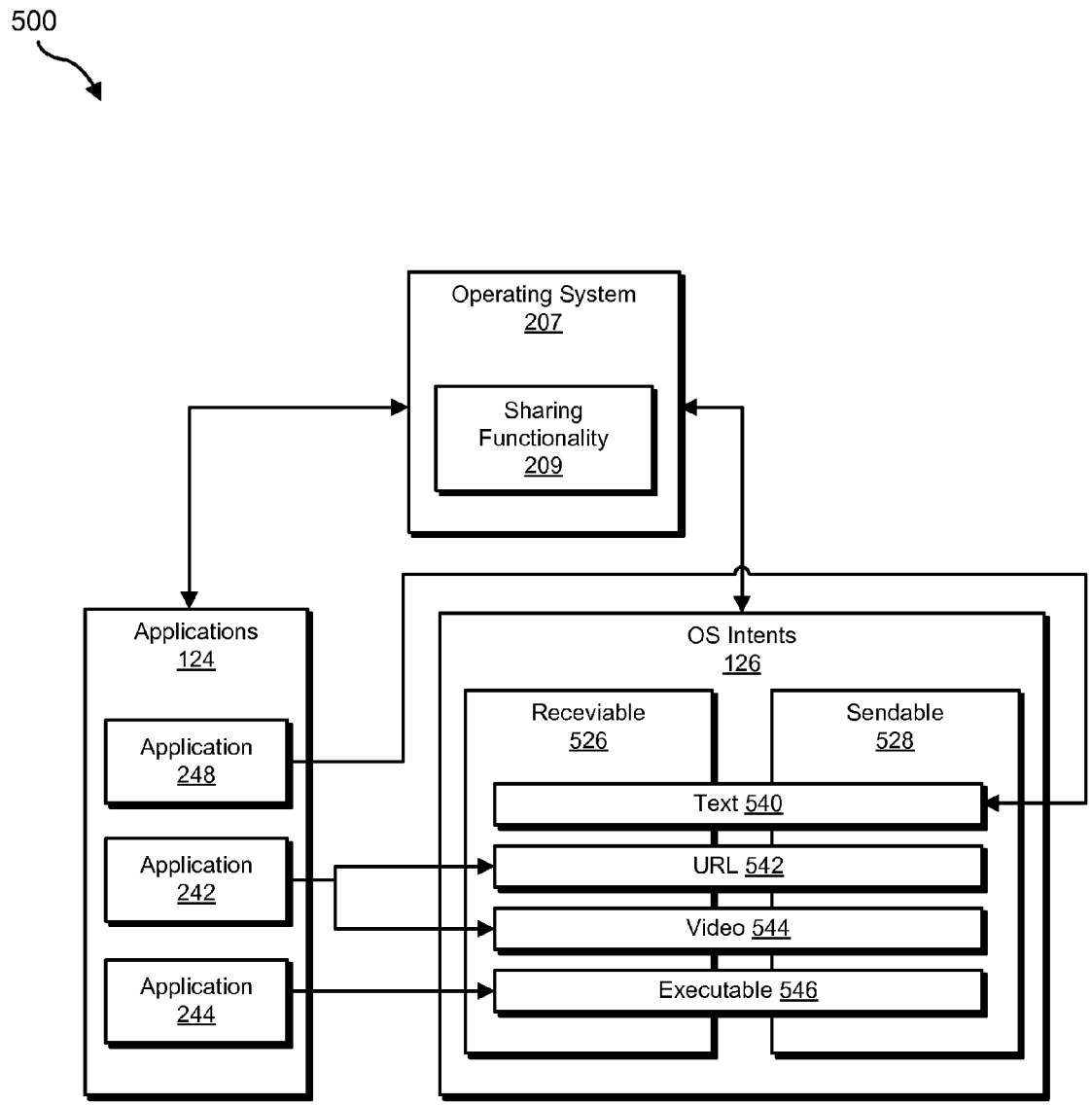
FIG. 5 is a block diagram of exemplary intent configurations for sharing functionality associated with an operating system.

In some embodiments, the selected application may be configured to handle an intent to share text through sharing functionality 209 provided by operating system 207. FIG. 5 shows an exemplary block diagram of exemplary intent configurations for sharing functionality associated with an operating system. As shown in FIG. 5, applications 124 may be configured to share and/or handle (or receive) shared content through sharing functionality 209 of operating system 207. Operating system intents 126 in FIG. 5 indicate configurations for applications to transmit and/or handle (or receive) intents, in a receivable column 526 and a sendable column 528.

In some examples, an application, such as a security application like NORTON INSIGHT, may handle (e.g., receive) the intent to share text, including for example the code "<action android:name='android.intent.action.SEND'/>" and/or <data android:mimeType='text/plain'/>" (the actual code may replace single apostrophes with double quotation marks). As shown in FIG. 5, an application 248, which may correspond to application distribution platform 250, may be configured to send an intent for text 540, as indicated by sendable column 528. The text may identify the application that the user is currently browsing or viewing (e.g., at the application's homepage or download page). For example, application 248 may be configured to transmit (e.g., indicate an intent to transmit) the location (e.g., UNIFORM RESOURCE LOCATION or "URL") of the application under consideration in a field named "intent.EXTRA_TEXT" and/or transmit the name of the application in the field "intent.EXTRA_SUBJECT."

Similarly, application 242 may be configured to receive or handle an intent to send video 544 and/or a URL 542 from another application, as indicated by receivable column 526. Moreover, application 244 may be configured to receive or handle an intent to send an executable 546, as indicated by receivable column 526. In some examples, the ability to send and/or receive intents may be recorded in an entry within operating system 207, as distinct from the corresponding application executing on operating system 207, such as in a database, registry (e.g., an ANDROID or other manifest file or EXTENDED MARKUP LANGUAGE FILE), and/or configuration file. In other embodiments, the ability may be additionally, or alternatively, recorded within the application itself or its associated configuration files (e.g, operating system 207 may record which applications can receive intents without necessarily knowing which applications can send corresponding intents, and/or only discover sending functionality upon identifying an intent by the application to try to share content).

In some embodiments, identification module 104 may identify shared content 220 in part by identifying shared content 220 in response to the user selecting a security application that obtains the security information and informs the user about the obtained security information. Returning to FIG. 4, the user (or identification module 104) may select the security application corresponding to button 436. Upon selecting button 436, application distribution platform 250 may share shared content 220 with the security application.

As discussed above, shared content 220 may include any content that is sharable between two applications, for example, using sharing functionality 209 of operating system 207 on which the applications may execute. In general, shared content 220 may indicate (wholly or partially) an identity of one or more application 124, which the user may be considering to download. Examples of shared content 220 that indicate the identity of the application include a text or character string (e.g., name, identifier, code word), including numbers, letters, and/or other characters, a hash, a URL associated with the application (e.g., the application's home page or page on application distribution platform 250), an image (e.g., bar code), sound, and/or video (e.g., theme or output music) identifying the application, content of the application itself (e.g., an executable, code, and/or library of the application), and/or a digital signature for the application (e.g., signed by its creator or distributor), for example.

In the example of FIG. 4, a user may select button 436 from among several buttons (or checkboxes, for example) for different applications. In other examples, however, identification module 104 may prompt the user with candidate applications (e.g., already checked in their checkboxes), and the user may simply confirm that the candidate applications are correct and should receive shared content 220. In further examples, identification module 104 may autonomously identify one or more receiving applications and share shared content 220 with those applications upon the user selecting share button 412. In still other examples, identification module 104 may prompt the user to share shared content 220, and/or autonomously share shared content 220, without the user first selecting share button 412 (e.g., based on a determination that the user likes the corresponding application, based on default rules or predefined settings, including user preferences, based on the user repeatedly interacting with the application over a threshold, based on a prompt by the application itself to be shared, and/or based on a request from another user and/or application for shared content 220, etc.).

In the example of FIG. 4, the security application for button 436 may receive the intent to share shared content 220. In other examples, however, the security application may, through identification module 104, simply identify sharing between two other applications, about a third application (e.g., application 244). For example, the security application may monitor sharing between two applications, such as between application distribution platform 250 (or a client-side application that interfaces with application distribution platform 250) and another application, such as the email application for button 432. In a more specific example, a user at application distribution platform 250 (as shown in FIG. 4) may attempt to share shared content 220 that identified application 244 with another person through the email application. Identification module 104 may identify, monitor, and/or intercept the attempt to share shared content 220. In some examples, identification module 104 may further scan shared content 220 for any indications of identities of applications for download. Obtaining module 106 and/or informing module 108 may then attempt to obtain security information for application 244 and/or inform the user about security implications for application 244, using any of the techniques described further below.

In the embodiments described above, sharing functionality 209 may be integrated with operating system 207 (e.g., sharing functionality within the ANDROID operating system). In alternative embodiments, the sharing functionality may be integrated with a social network (e.g., FACEBOOK sharing) or community websites (e.g., REDDIT), using a web-enabled sharing button and corresponding functionality, for example. In these cases, identification module 104 may similarly identify, monitor, and/or intercept attempts to share content identifying one or more applications. Identification module 104 may similarly constitute part of a virtual guardian or user account (e.g., bot) at the social network or community website that may receive shared content 220 and reply (e.g., automatically or autonomously) with the obtained security information. Identification module 104 may scan shared content 220 for any content identifying one or more applications, and systems 100 and 200 may only then attempt to provide information about those applications. In other embodiments, systems 100 and 200 may attempt to obtain security information associated with any (e.g. all) shared content 220 shared using the corresponding sharing functionality (e.g., searching reputations 122 for any reputations associated with strings and/or hashes within shared content 220 without first identifying an application identified by shared content 220).

Returning to FIG. 3, at step 304 one or more of the systems described herein may, in response to identifying the shared content, obtain security information about the application identified by the shared content. For example, obtaining module 106 may, as part of computing device 202 in FIG. 2, and in response to identifying shared content 220, obtain security information, such as a reputation from reputations 122, about application 244 identified by shared content 220. As used herein, the phrase "security information" generally refers to information that indicates a threat to a user's security and/or privacy, including security from malware, viruses, privacy breaches, annoyances, and/or performance impacts.

Obtaining module 106 may obtain security information about application 244 identified by shared content 220 in a variety of ways. In some examples, obtaining module 106 may obtain the security information in part by looking up a reputation of application 244 identified by shared content 220 in a reputation database, such as reputations 122 in database 120. The reputation may indicate a reputation for security threats, such as malware, viruses, trojans, worms, etc. The reputation may similarly indicate a degree to which application 244 is known to be associated with (A) annoyances (e.g., excessive, repetitive, uncontrolled, unsolicited, loud, and/or bright events, including interruptions and/or stealing focus), (B) privacy threats such as revealing personally identifying information or financial information or other confidential information (e.g., emails, texts, and social network content), and/or (C) performance impact (e.g., impact on memory, processor, battery, secondary storage, and/or network bandwidth, etc.). For each of these degrees and sub-degrees (e.g., degree of battery consumption), reputations 122 may additionally, or alternatively, identify one or more corresponding thresholds and/or indicate whether the application is known to cross the threshold(s) (e.g., crosses a threshold of excessive battery consumption). Moreover, additionally, or alternatively, obtaining module 106 may perform its own security analysis for all, or part, of these items of information, without retrieving the information from a database (e.g., to supplement or substitute for preexisting reputations from a database).

Returning to FIG. 3, at step 306 one or more of the systems described herein may inform, prior to a user downloading the application, the user of the obtained security information about the application to enable the user to make an informed decision about whether to download the application. For example, informing module 108 may, as part of computing device 202 in FIG. 2, and prior to a user downloading application 244, inform the user of the obtained security information about application 244 to enable the user to make an informed decision about whether to download application 244.

Informing module 108 may inform the user of the obtained security information about application 244 in a variety of ways. In some examples, informing module 108 may inform the user of the obtained security information in part by informing the user about the reputation from reputations 122 for application 244.

Figure 6:
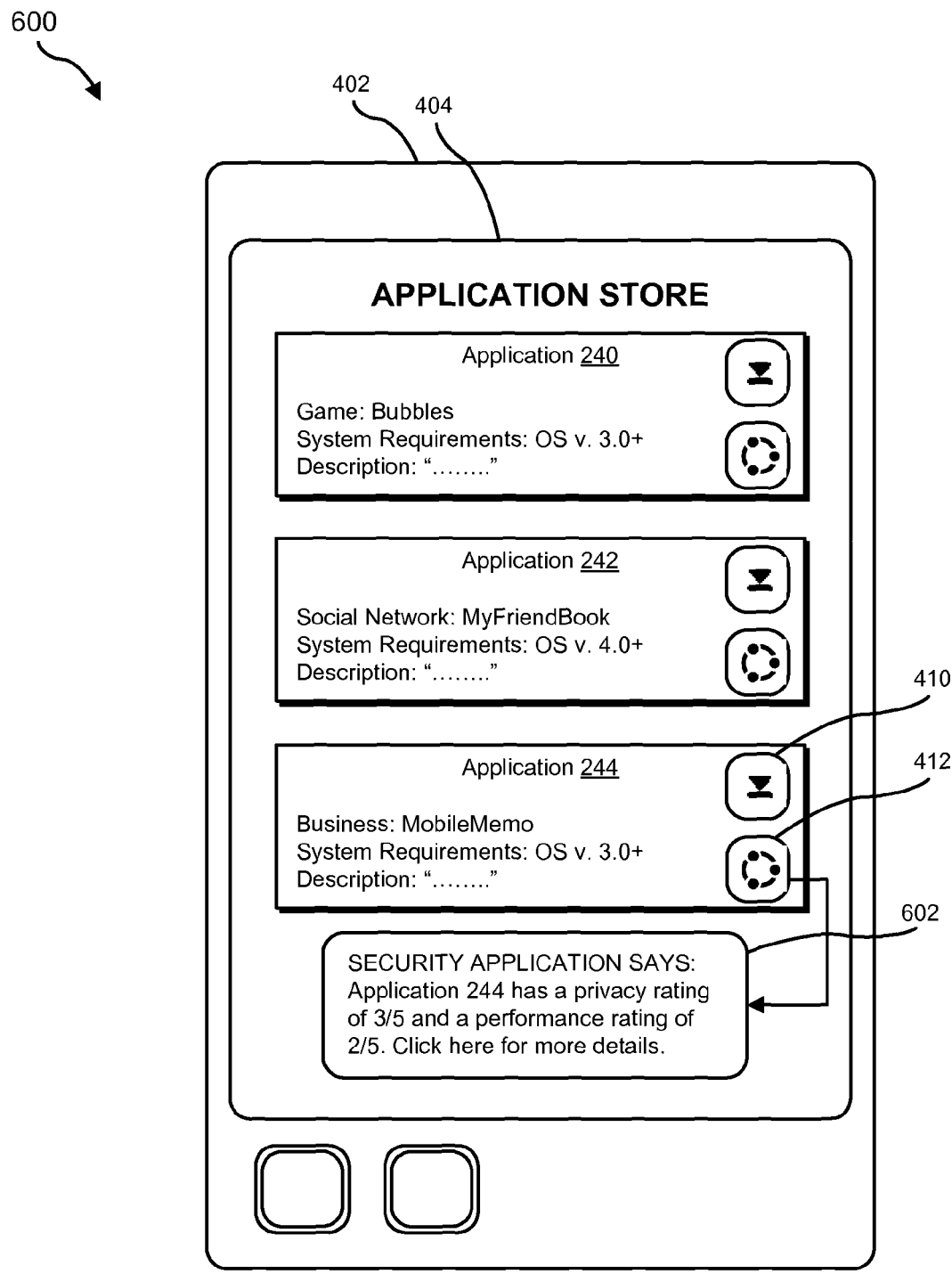
FIG. 6 is a block diagram of a graphical user interface showing security information about the application.

FIG. 6 shows an exemplary block diagram 600, which may correspond to FIG. 4, but which indicates output from informing module 108 after identification module 104 identifies shared content 220. Informing module 108 may inform the user of the obtained security information by displaying a graphic 602, which may contain the security information, or information derived from the security information. In the example of FIG. 6, graphic 602 may contain the text, "SECURITY APPLICATION SAYS: Application 244 has a privacy rating of 3/5 and a performance rating of 2/5." Graphic 602 may further state, "[c]lick here for more details." Accordingly, informing module 108 may inform the user about one or more security, privacy, annoyance, and/or performance degrees, values, ratings, and/or thresholds (as discussed above for obtaining module 106), and/or one or more ratings, scores, and/or percentages, which may be based on the same degrees and thresholds, etc. In the specific example of FIG. 6, application 244 may have a medium privacy rating of "3/5" or 60%, and a low performance rating of "2/5" or 40%. These scales may be absolute along an objective measurement of security or safety, and/or may be relative to the performance or security profiles for one or more other applications (e.g., other applications hosted by application distribution platform 250).

In some examples, informing module 108 may also display one or more aggregated scores, which may themselves be based on two or more underlying sub-scores or sub-values, which may be weighted the same or differently in the calculation of the aggregated score. For example, informing modules 108 may inform the user of one or more health scores or reports, each including an aggregated value based on two or more of: a malware value, a privacy value, an annoyance value, and/or a performance value.

As shown in FIG. 6, graphic 602 may overlap a window or display for application distribution platform 250. In other examples, informing module 108 may steal focus, switch applications (e.g., load a security application), and/or display an entire window (e.g., for a security application) on screen 404. Notably, the phrase "[c]lick here for more details" indicates one example of how a user may elect or confirm to observe further security information beyond an initial presentation of security information (e.g., information that does not fit within graphic 602). In some examples, informing module may, through graphic 602, also display a brand, name, and/or logo for the security or insight application, such as a brand, name, and/or logo for NORTON INSIGHT. In further examples, informing modules may use one or more of visual, auditory, vibration, haptic, virtual reality, a network connected printer, and/or other output components to inform the user about the security information.

Lastly, in some examples, obtaining module 106 may be unable to obtain one or more items of security information about the identified application. In one specific example, reputations 122 may lack one or more items of information about a current version of the application currently hosted on application distribution platform 250. Nevertheless, reputations 122 may (or may not) contain security information about earlier versions of the identified application. In these cases, informing module 108 may inform the user about: (A) the inability to obtain one or more items of security information, (B) earlier version(s) of the same application, (C) comparable applications that perform comparable or related functionality, (D) security information known for the earlier version(s) or comparable applications (e.g., applications associated as related within database 120 and/or application distribution platform 250), (D) information on how to access or download these other versions or comparable applications, and/or (E) any other available information about the identified application, earlier version(s) of the identified application, and/or comparable or substitute applications.

As discussed above, the disclosed systems and methods may automatically inform a user about security implications associated with an application prior to the user downloading and/or executing the application. In doing so, the disclosed systems and methods may leverage sharing functionality provided by an operating system to streamline the education of the user. The user may thereby make better informed decisions about whether to download and/or execute various applications.

Figure 7:
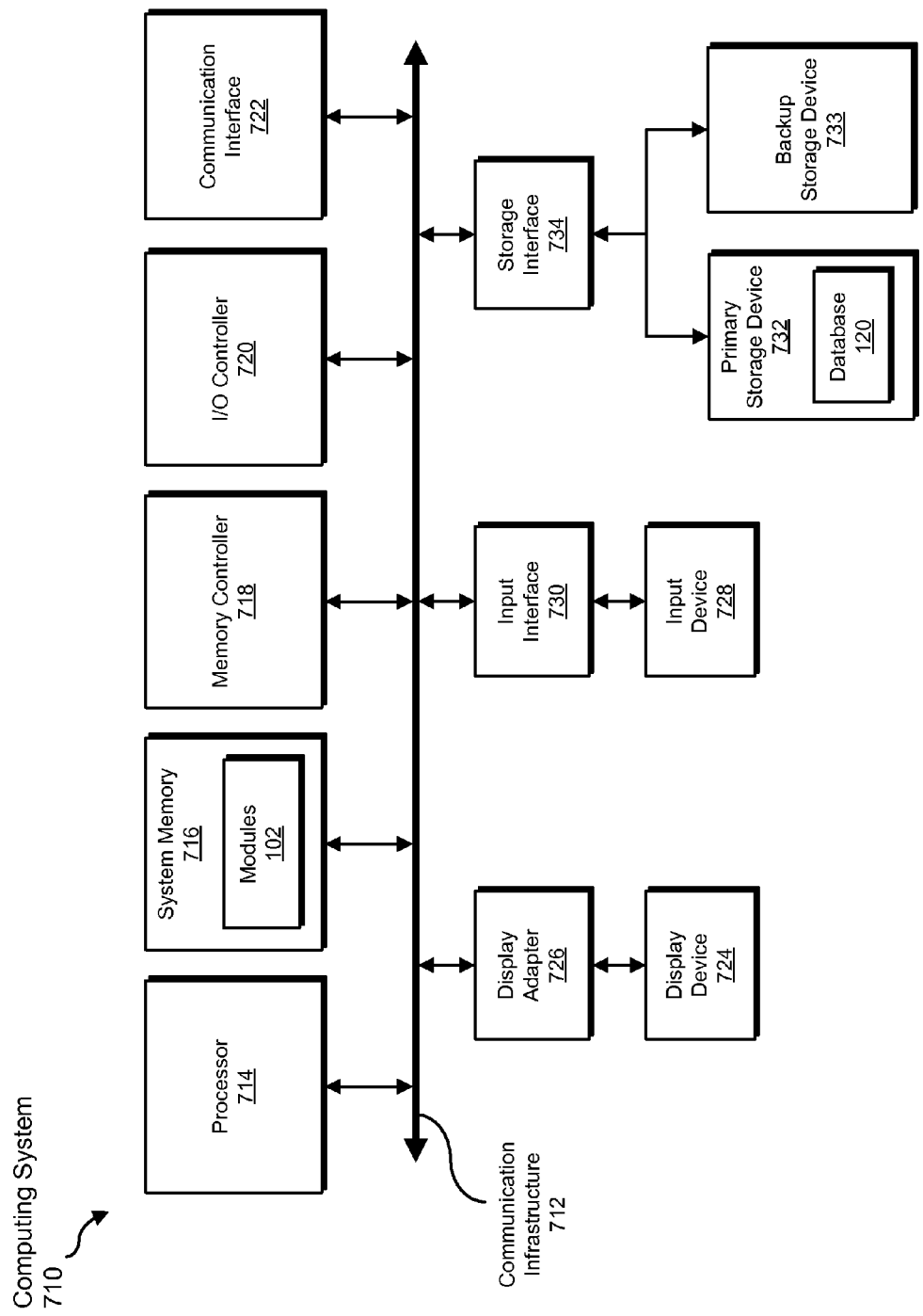
FIG. 7 is a block diagram of an exemplary computing system capable of implementing one or more of the embodiments described and/or illustrated herein.

FIG. 7 is a block diagram of an exemplary computing system 710 capable of implementing one or more of the embodiments described and/or illustrated herein. For example, all or a portion of computing system 710 may perform and/or be a means for performing, either alone or in combination with other elements, one or more of the steps described herein (such as one or more of the steps illustrated in FIG. 3). All or a portion of computing system 710 may also perform and/or be a means for performing any other steps, methods, or processes described and/or illustrated herein.

Computing system 710 broadly represents any single or multi-processor computing device or system capable of executing computer-readable instructions. Examples of computing system 710 include, without limitation, workstations, laptops, client-side terminals, servers, distributed computing systems, handheld devices, or any other computing system or device. In its most basic configuration, computing system 710 may include at least one processor 714 and a system memory 716.

Processor 714 generally represents any type or form of physical processing unit (e.g., a hardware-implemented central processing unit) capable of processing data or interpreting and executing instructions. In certain embodiments, processor 714 may receive instructions from a software application or module. These instructions may cause processor 714 to perform the functions of one or more of the exemplary embodiments described and/or illustrated herein.

As explained above, the disclosed systems and methods may automatically inform a user about security implications associated with an application prior to the user downloading and/or executing the application. In doing so, the disclosed systems and methods may leverage sharing functionality provided by an operating system to streamline the education of the user. The user may thereby make better informed decisions about whether to download and/or execute applications.

System memory 716 generally represents any type or form of volatile or non-volatile storage device or medium capable of storing data and/or other computer-readable instructions. Examples of system memory 716 include, without limitation, Random Access Memory (RAM), Read Only Memory (ROM), flash memory, or any other suitable memory device. Although not required, in certain embodiments computing system 710 may include both a volatile memory unit (such as, for example, system memory 716) and a non-volatile storage device (such as, for example, primary storage device 732, as described in detail below). In one example, one or more of modules 102 from FIG. 1 may be loaded into system memory 716.

In certain embodiments, exemplary computing system 710 may also include one or more components or elements in addition to processor 714 and system memory 716. For example, as illustrated in FIG. 7, computing system 710 may include a memory controller 718, an Input/Output (I/O) controller 720, and a communication interface 722, each of which may be interconnected via a communication infrastructure 712. Communication infrastructure 712 generally represents any type or form of infrastructure capable of facilitating communication between one or more components of a computing device. Examples of communication infrastructure 712 include, without limitation, a communication bus (such as an Industry Standard Architecture (ISA), Peripheral Component Interconnect (PCI), PCI Express (PCIe), or similar bus) and a network.

Memory controller 718 generally represents any type or form of device capable of handling memory or data or controlling communication between one or more components of computing system 710. For example, in certain embodiments memory controller 718 may control communication between processor 714, system memory 716, and I/O controller 720 via communication infrastructure 712.

I/O controller 720 generally represents any type or form of module capable of coordinating and/or controlling the input and output functions of a computing device. For example, in certain embodiments I/O controller 720 may control or facilitate transfer of data between one or more elements of computing system 710, such as processor 714, system memory 716, communication interface 722, display adapter 726, input interface 730, and storage interface 734.

Communication interface 722 broadly represents any type or form of communication device or adapter capable of facilitating communication between exemplary computing system 710 and one or more additional devices. For example, in certain embodiments communication interface 722 may facilitate communication between computing system 710 and a private or public network including additional computing systems. Examples of communication interface 722 include, without limitation, a wired network interface (such as a network interface card), a wireless network interface (such as a wireless network interface card), a modem, and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a telephone or cable network, a cellular telephone connection, a satellite data connection, or any other suitable connection.

In certain embodiments, communication interface 722 may also represent a host adapter configured to facilitate communication between computing system 710 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 722 may also allow computing system 710 to engage in distributed or remote computing. For example, communication interface 722 may receive instructions from a remote device or send instructions to a remote device for execution.

As illustrated in FIG. 7, computing system 710 may also include at least one display device 724 coupled to communication infrastructure 712 via a display adapter 726. Display device 724 generally represents any type or form of device capable of visually displaying information forwarded by display adapter 726. Similarly, display adapter 726 generally represents any type or form of device configured to forward graphics, text, and other data from communication infrastructure 712 (or from a frame buffer, as known in the art) for display on display device 724.

As illustrated in FIG. 7, exemplary computing system 710 may also include at least one input device 728 coupled to communication infrastructure 712 via an input interface 730. Input device 728 generally represents any type or form of input device capable of providing input, either computer or human generated, to exemplary computing system 710. Examples of input device 728 include, without limitation, a keyboard, a pointing device, a speech recognition device, or any other input device.

As illustrated in FIG. 7, exemplary computing system 710 may also include a primary storage device 732 and a backup storage device 733 coupled to communication infrastructure 712 via a storage interface 734. Storage devices 732 and 733 generally represent any type or form of storage device or medium capable of storing data and/or other computer-readable instructions. For example, storage devices 732 and 733 may be a magnetic disk drive (e.g., a so-called hard drive), a solid state drive, a floppy disk drive, a magnetic tape drive, an optical disk drive, a flash drive, or the like. Storage interface 734 generally represents any type or form of interface or device for transferring data between storage devices 732 and 733 and other components of computing system 710. In one example, database 120 from FIG. 1 may be stored in primary storage device 732.

In certain embodiments, storage devices 732 and 733 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 733 may also include other similar structures or devices for allowing computer software, data, or other computer-readable instructions to be loaded into computing system 710. For example, storage devices 732 and 733 may be configured to read and write software, data, or other computer-readable information. Storage devices 732 and 733 may also be a part of computing system 710 or may be a separate device accessed through other interface systems.

Many other devices or subsystems may be connected to computing system 710. Conversely, all of the components and devices illustrated in FIG. 7 need not be present to practice the embodiments described and/or illustrated herein. The devices and subsystems referenced above may also be interconnected in different ways from that shown in FIG. 7. Computing system 710 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 710. All or a portion of the computer program stored on the computer-readable medium may then be stored in system memory 716 and/or various portions of storage devices 732 and 733. When executed by processor 714, a computer program loaded into computing system 710 may cause processor 714 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 710 may be configured as an Application Specific Integrated Circuit (ASIC) adapted to implement one or more of the exemplary embodiments disclosed herein.

Figure 8:
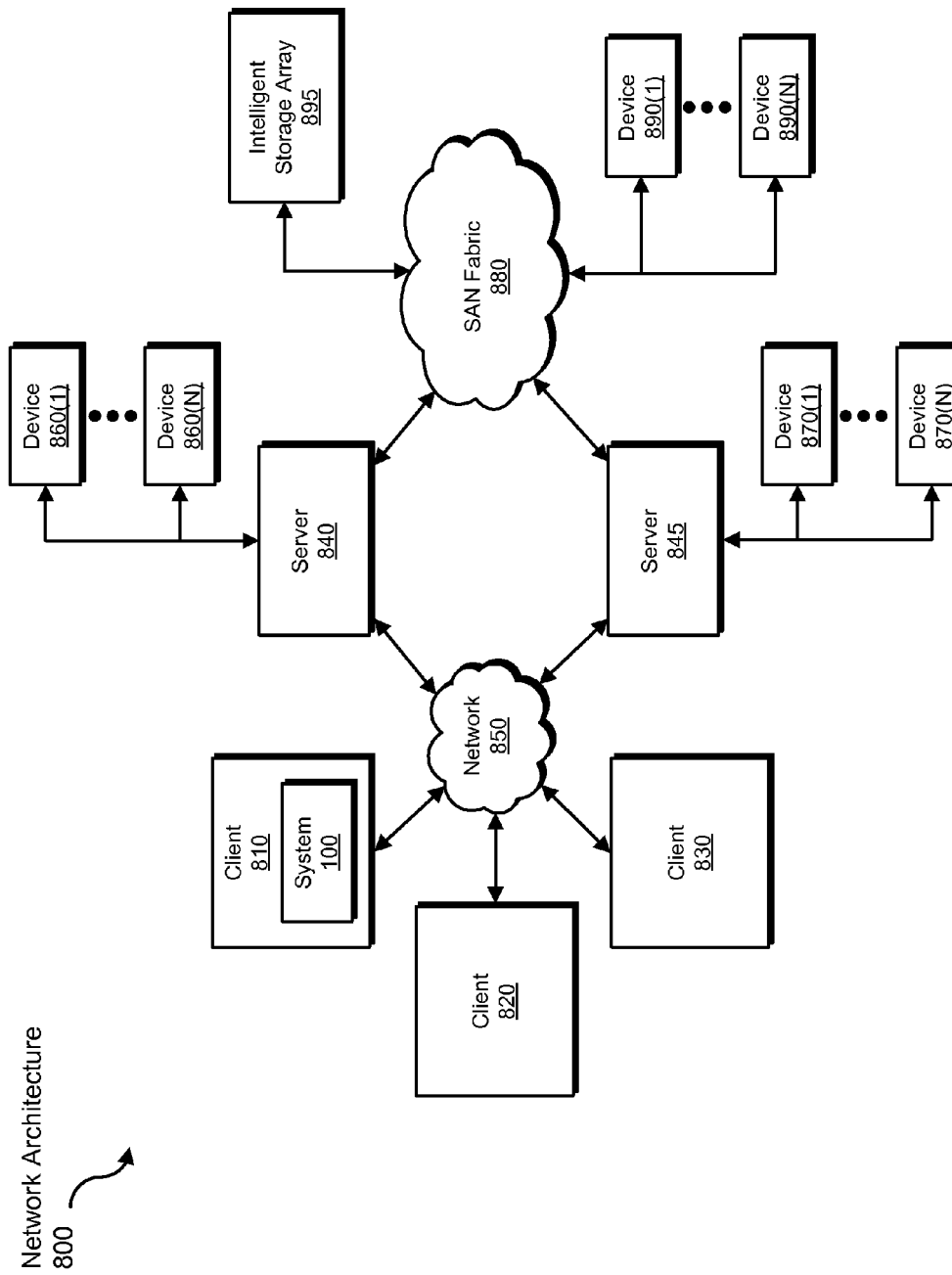
FIG. 8 is a block diagram of an exemplary computing network capable of implementing one or more of the embodiments described and/or illustrated herein.

FIG. 8 is a block diagram of an exemplary network architecture 800 in which client systems 810, 820, and 830 and servers 840 and 845 may be coupled to a network 850. As detailed above, all or a portion of network architecture 800 may perform and/or be a means for performing, either alone or in combination with other elements, one or more of the steps disclosed herein (such as one or more of the steps illustrated in FIG. 3). All or a portion of network architecture 800 may also be used to perform and/or be a means for performing other steps and features set forth in the instant disclosure.

Client systems 810, 820, and 830 generally represent any type or form of computing device or system, such as exemplary computing system 710 in FIG. 7. Similarly, servers 840 and 845 generally represent computing devices or systems, such as application servers or database servers, configured to provide various database services and/or run certain software applications. Network 850 generally represents any telecommunication or computer network including, for example, an intranet, a WAN, a LAN, a PAN, or the Internet. In one example, client systems 810, 820, and/or 830 and/or servers 840 and/or 845 may include all or a portion of system 100 from FIG. 1.

As illustrated in FIG. 8, one or more storage devices 860(1)-(N) may be directly attached to server 840. Similarly, one or more storage devices 870(1)-(N) may be directly attached to server 845. Storage devices 860(1)-(N) and storage devices 870(1)-(N) generally represent any type or form of storage device or medium capable of storing data and/or other computer-readable instructions. In certain embodiments, storage devices 860(1)-(N) and storage devices 870(1)-(N) may represent Network-Attached Storage (NAS) devices configured to communicate with servers 840 and 845 using various protocols, such as Network File System (NFS), Server Message Block (SMB), or Common Internet File System (CIFS).

Servers 840 and 845 may also be connected to a Storage Area Network (SAN) fabric 880. SAN fabric 880 generally represents any type or form of computer network or architecture capable of facilitating communication between a plurality of storage devices. SAN fabric 880 may facilitate communication between servers 840 and 845 and a plurality of storage devices 890(1)-(N) and/or an intelligent storage array 895. SAN fabric 880 may also facilitate, via network 850 and servers 840 and 845, communication between client systems 810, 820, and 830 and storage devices 890(1)-(N) and/or intelligent storage array 895 in such a manner that devices 890(1)-(N) and array 895 appear as locally attached devices to client systems 810, 820, and 830. As with storage devices 860(1)-(N) and storage devices 870(1)-(N), storage devices 890(1)-(N) and intelligent storage array 895 generally represent any type or form of storage device or medium capable of storing data and/or other computer-readable instructions.

In certain embodiments, and with reference to exemplary computing system 710 of FIG. 7, a communication interface, such as communication interface 722 in FIG. 7, may be used to provide connectivity between each client system 810, 820, and 830 and network 850. Client systems 810, 820, and 830 may be able to access information on server 840 or 845 using, for example, a web browser or other client software. Such software may allow client systems 810, 820, and 830 to access data hosted by server 840, server 845, storage devices 860(1)-(N), storage devices 870(1)-(N), storage devices 890(1)-(N), or intelligent storage array 895. Although FIG. 8 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 840, server 845, storage devices 860(1)-(N), storage devices 870(1)-(N), storage devices 890(1)-(N), intelligent storage array 895, or any combination thereof. All or a portion of one or more of the exemplary embodiments disclosed herein may also be encoded as a computer program, stored in server 840, run by server 845, and distributed to client systems 810, 820, and 830 over network 850.

As detailed above, computing system 710 and/or one or more components of network architecture 800 may perform and/or be a means for performing, either alone or in combination with other elements, one or more steps of an exemplary method for informing users about applications available for download.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive shared content and/or a request for security information to be transformed, transform the shared content and/or request, output a result of the transformation to a display or speaker, use the result of the transformation to inform users about applications available for download, and store the result of the transformation to memory or storage, for example. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for informing users about applications available for download, at least a portion of the method being performed by a computing device comprising at least one processor, the method comprising:

identifying, by a mobile security application through sharing functionality provided by an operating system, and in response to selection of a graphical button that initiates sharing through the sharing functionality and that is located within a browser application enabling browsing of applications on an application distribution platform, shared content that identifies an application hosted by the application distribution platform, the shared content comprising text that specifies at least one of a location for the application on the application distribution platform and an identity of the application, such that the shared content is shared with the mobile security application from the browser application;

in response to identifying the shared content, obtaining, by the mobile security application, security information about the application identified by the shared content;

informing, by the mobile security application and prior to a user downloading the application, the user of the obtained security information about the application to enable the user to make an informed decision about whether to download the application.

2. The method of claim 1, wherein informing the user of the obtained security information comprises displaying a graphical warning.

3. The method of claim 1, wherein the graphical button is displayed as an icon that designates sharing within the operating system.

4. The method of claim 1, wherein informing the user comprises informing the user about an inability to obtain an additional item of security information.

5. The method of claim 1, wherein the mobile security application is configured to handle an intent to share text through the sharing functionality provided by the operating system.

6. The method of claim 5, wherein the mobile security application records its ability to handle the intent within at least one of:

a manifest file;

an extended markup language file.

7. The method of claim 5, wherein the shared content is inserted within at least one of:

an intent.EXTRA TEXT field of the intent;

an intent.EXTRA SUBJECT field of the intent.

8. The method of claim 1, wherein obtaining the security information comprises looking up a reputation of the application identified by the shared content in a reputation database.

9. The method of claim 8, wherein informing the user of the obtained security information comprises informing the user about the reputation of the application.

10. The method of claim 1, wherein the shared content comprises a uniform resource locator for the application on the application distribution platform.

11. A system for informing users about applications available for download, the system comprising:

an identification module, stored in memory, that identifies, as part of a mobile security application, through sharing functionality provided by an operating system, and in response to selection of a graphical button that initiates sharing through the sharing functionality and that is located within a browser application enabling browsing of applications on an application distribution platform, shared content that identifies an application hosted by the application distribution platform, the shared content comprising text that specifies at least one of a location for the application on the application distribution platform and an identity of the application, such that the shared content is shared with the mobile security application from the browser application;

an obtaining module, stored in the memory that, in response to the identification of the shared content, obtains, as part of the mobile security application, security information about the application identified by the shared content;

an informing module, stored in the memory, that, as part of the mobile security application and prior to a user downloading the application, informs the user of the obtained security information about the application to enable the user to make an informed decision about whether to download the application;

at least one processor that executes the identification module, the obtaining module, and the informing module.

12. The system of claim 11, wherein the informing module informs the user of the obtained security information at least in part by displaying a graphical warning.

13. The system of claim 11, wherein the graphical button is displayed as an icon that designates sharing within the operating system.

14. The system of claim 11, wherein the informing module informs the user at least in part by informing the user about an inability to obtain an additional item of security information.

15. The system of claim 11, wherein the mobile security application is configured to handle an intent to share text through the sharing functionality provided by the operating system.

16. The system of claim 15, wherein the mobile security application records its ability to handle the intent within at least one of:

a manifest file;

an extended markup language file.

17. The system of claim 15, wherein the shared content is inserted within at least one of:

an intent.EXTRA TEXT field of the intent;

an intent.EXTRA SUBJECT field of the intent.

18. The system of claim 11, wherein the obtaining module obtains the security information at least in part by looking up a reputation of the application identified by the shared content in a reputation database.

19. The system of claim 18, wherein the informing module informs the user of the obtained security information at least in part by informing the user about the reputation of the application.

20. A non-transitory computer-readable medium comprising one or more computer-executable instructions that, when executed by at least one processor of a computing device, cause the computing device to:

identify, by a mobile security application through sharing functionality provided by an operating system, and in response to selection of a graphical button that initiates sharing through the sharing functionality and that is located within a browser application enabling browsing of applications on an application distribution platform, shared content that identifies an application hosted by the application distribution platform, the shared content comprising text that specifies at least one of a location for the application on the application distribution platform and an identity of the application, such that the shared content is shared with the mobile security application from the browser application;

in response to identifying the shared content, obtain, by the mobile security application, security information about the application identified by the shared content;

inform, by the mobile security application and prior to a user downloading the application, the user of the obtained security information about the application to enable the user to make an informed decision about whether to download the application.

* * * * *